(No Model.)

T. WETSCHEREK.
COOKING UTENSIL.

No. 515,565.

Patented Feb. 27, 1894.

Witnesses:
H. G. Dieterich
Henry Orth

Inventor:
Theodor Wetscherek
By Henry Orth, atty.

UNITED STATES PATENT OFFICE.

THEODOR WETSCHEREK, OF VIENNA, AUSTRIA-HUNGARY.

COOKING UTENSIL.

SPECIFICATION forming part of Letters Patent No. 515,565, dated February 27, 1894.

Application filed June 1, 1891. Serial No. 394,725. (No model.)

*To all whom it may concern:*

Be it known that I, THEODOR WETSCHEREK, military commissary, a subject of the Emperor of Austria-Hungary, residing at Vienna, in the Province of Lower Austria, in the Empire of Austria-Hungary, have invented certain new and useful Improvements in Cooking Utensils; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to cooking utensils, and more particularly to that class of utensils adapted for the preparation of decoctions, as of coffee, tea, &c., and it consists in structural features and combinations of parts as will now be fully described, reference being had to the accompanying drawings, in which—

Figure 1:
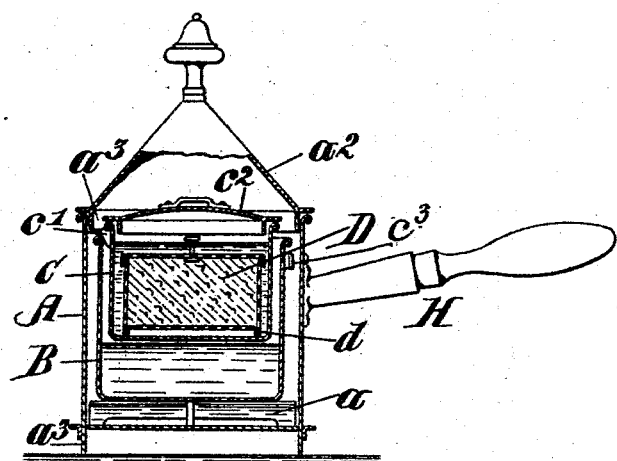
Figure 4:
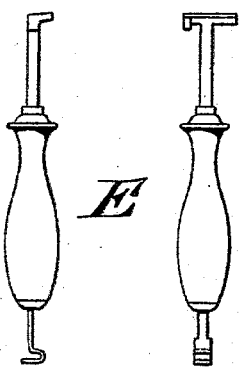
Figure 2:
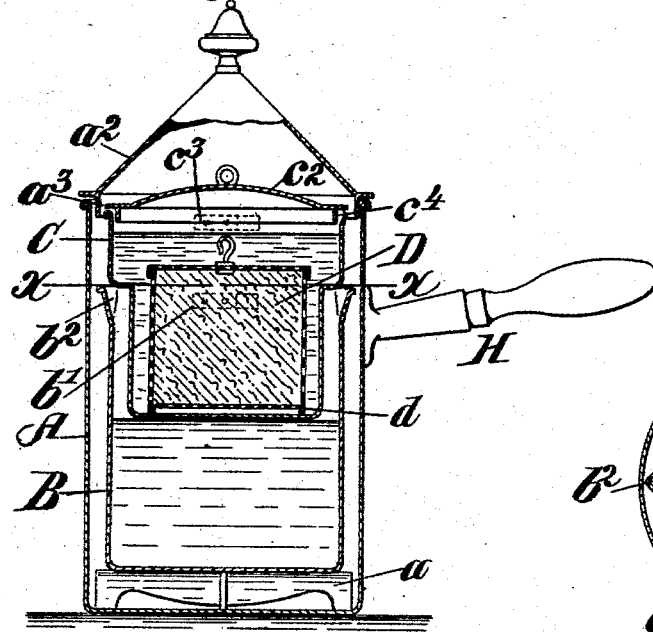
Figure 3:
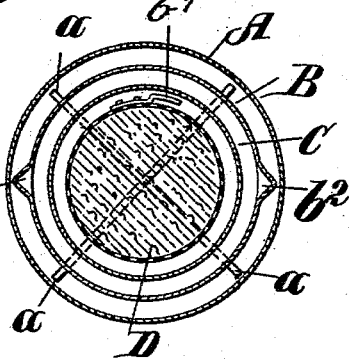

Figures 1 and 2 are vertical sectional elevations of a cooking utensil embodying my invention, the utensil shown in Fig. 2 differing from that shown in Fig. 1 mainly in the dimensions of the several vessels and structural modifications resulting therefrom or necessary thereto. Fig. 3 is a cross section taken about on line $x$—$x$ of Fig. 2, the handle of the outer vessel being omitted, and Fig. 4 shows elevations at right angles to each other of a lifter of suitable construction for the manipulation of the contained vessel and some of the lids of the utensil.

My improved cooking utensil or coffee or tea pot comprises an outer vessel A, which constitutes the steam generator said vessel adapted to be closed by a lid $a^2$; a vessel B contained in vessel A for the reception of milk, a vessel C for the reception of the water necessary to the preparation of the decoction or infusion, said vessel C suspended in vessel B and adapted to be closed by a lid $c^2$, and a box D for the coffee or tea, said box constructed wholly of a foraminous material, as perforated sheet metal, wire fabric, or the like.

The dimensions of the vessels B, C, and D, are such as to readily fit one within the other and into the vessel A and to leave a suitable space between them, and as it is my object to cook the food or prepare coffee or tea and heat or boil the milk by means of steam at low pressure or tension, the lids or covers $a^2$, $c^2$ are not constructed to hermetically close the vessels A and C respectively. Inasmuch as the volume of heat required to boil a given volume of liquid or cook a given quantity of food is very small relatively to said volume or quantity, but a comparatively small quantity of liquid is required to generate the necessary amount of steam. I so support the vessels within one another that the quantity of liquid from which the necessary steam is to be generated to produce the required heat for the cooking of the food or the preparation of the decoction or infusion, will not rise much above the bottom of the contained vessels, so that their relative arrangement will depend in a measure upon the capacity of the utensil.

In the drawings I have shown the vessel B supported at such a distance above the bottom of the vessel A, by means of a suitable support, as a seat ring or a four-armed stand $a$ that the water necessary to the generation of steam will not rise much above the bottom of said vessel B. The same relative arrangement is maintained in so far as vessels B and C are concerned, while the foraminous vessel D is necessarily immersed in the water contained in vessel C, in the preparation of coffee or tea.

In Fig. 1 I have shown the vessel C as provided with radial lips or projections $c'$, that have bearing on the rim or upper edge of vessel B, an annular space being left between the two vessels B and C for the circulation and escape of the steam or vapors from the contained milk. In Fig. 2, which shows a vessel of greater capacity, the vessel C has its upper portion of greater diameter than its lower portion, to adapt said vessel to seat on the rim or upper edge of vessel B, which latter is provided with radially extended steam escape ports or passages $b^2$, that also serve the purpose of pouring spouts. The vessels, B, C, and D, are each provided with a lifting bracket, as shown at $c^3$ Figs. 1 and 2, and $b'$, Figs. 2 and 3, respectively, the vessels being lifted out of one another by means of a lifter E, Fig. 4, of suitable construction.

The amount of heat required to heat the comparatively small quantity of water in such vessel A sufficiently to generate steam being small, such heat may be supplied from a spirit lamp or from a gas jet, the heat of the steam being transmitted to vessel B, whereby the milk therein is heated to the same degree, while the milk conveys the heat to the water in vessel C, resulting in a decoction or infusion of the contents of the foraminous vessel or box D. The vessel A is provided with a handle H, for obvious purposes. A few minutes will suffice to prepare one or two cups of coffee and heat or boil the milk therefor in an apparatus of a corresponding capacity, and as the vessel C is closed by a lid $c^2$ the aroma is preserved.

Should the pressure in the vessel A rise above that exerted by the weight of the lid $a^2$, the latter will be lifted, allowing the steam to escape freely, thereby reducing the pressure within said vessel A, and in order that the steam may escape freely as soon as the cover $a^2$ commences to lift, the flange $a^3$ thereof that fits into said vessel A is of less diameter than the latter, as shown.

In order that the water in vessel C may have free access to all sides of vessel or box D, the latter is provided with feet $d$, so that the bottom of said vessel D will be at a suitable distance from the bottom of vessel C.

It will readily be understood that other articles of food may be prepared in the described utensil, such articles being placed in the vessels B and C with the required quantity of liquid, the vessel or box D being dispensed with. Though in the preparation of certain kinds of liquid food, as beef tea, or the like, the meat, or the meat and vegetables and the condiments may be contained in vessel D.

The advantages derived from the described construction consist essentially of the possibility of boiling different liquids or cooking different kinds of food without any great danger of intercontamination, in view of the fact that the products of condensation from one vessel do not have ready access to the other because of the cover for vessel C whose flange protects the upper edge of the vessel. On the other hand, when the substances in both vessels have been brought to a boiling point the steam escaping from one will commingle with that of the other and the greatest amount of condensation will take place upon the inner surface of the outer vessel and the outer surface of the vessel B and flow thence into the water used as a heating agent. But as soon as the steam pressure within the utensil becomes sufficiently great to overcome the weight of the cover of the outer vessel most of the steam will escape into the atmosphere.

Having thus described my invention, what I claim as new therein, and desire to secure by Letters Patent, is—

1. A cooking utensil, comprising a steam heater adapted to be closed by a loosely fitting cover, a cooking vessel of less cross-sectional area than and supported within said heater above the bottom thereof, and a second cooking vessel fitting into said first cooking vessel and supported above the bottom thereof so as to allow free escape of steam or vapor from between the two, said second cooking vessel adapted to be closed by a loosely fitting cover, both cooking vessels being constructed of a non-foraminous material, for the purpose set forth.

2. A cooking utensil comprising a steam heater adapted to be closed by a loosely fitting cover, a cooking vessel of less cross-sectional area than and supported in the heater above the bottom thereof, a second cooking vessel fitting into said first cooking vessel and supported above the bottom thereof so as to allow free escape of steam or vapor from between the two, a loosely fitting cover for said second cooking vessel, both cooking vessels constructed of a non-foraminous material, a vessel constructed wholly of a foraminous material, and a cover of like material therefor, said last named vessel smaller than and supported within the second cooking vessel above the bottom thereof.

3. The combination with the vessel A provided with a suitable handle and with a loosely fitting cover $a^2$, of the vessel B, the support $a$ therefor, the vessel C provided with a loosely fitting cover $c^2$ and suspended in vessel C, said vessels B and C and covers $a^2, c^2$, constructed of a non-foraminous material, and the vessel D and its cover both constructed of a foraminous material, said vessel D provided with suitable feet and contained in vessel C, said parts being arranged relatively to each other and operating substantially as and for the purpose set forth.

In testimony whereof I affix my signature in presence of two witnesses.

THEODOR WETSCHEREK.

Witnesses:
A. SCHLESSING,
W. B. MURPHY.